Nov. 9, 1943.　　　　　B. A. PARR　　　　　2,333,737
FOCUSSING DEVICES FOR ROLL-FILM CAMERAS
Filed Nov. 17, 1939　　　　4 Sheets-Sheet 1
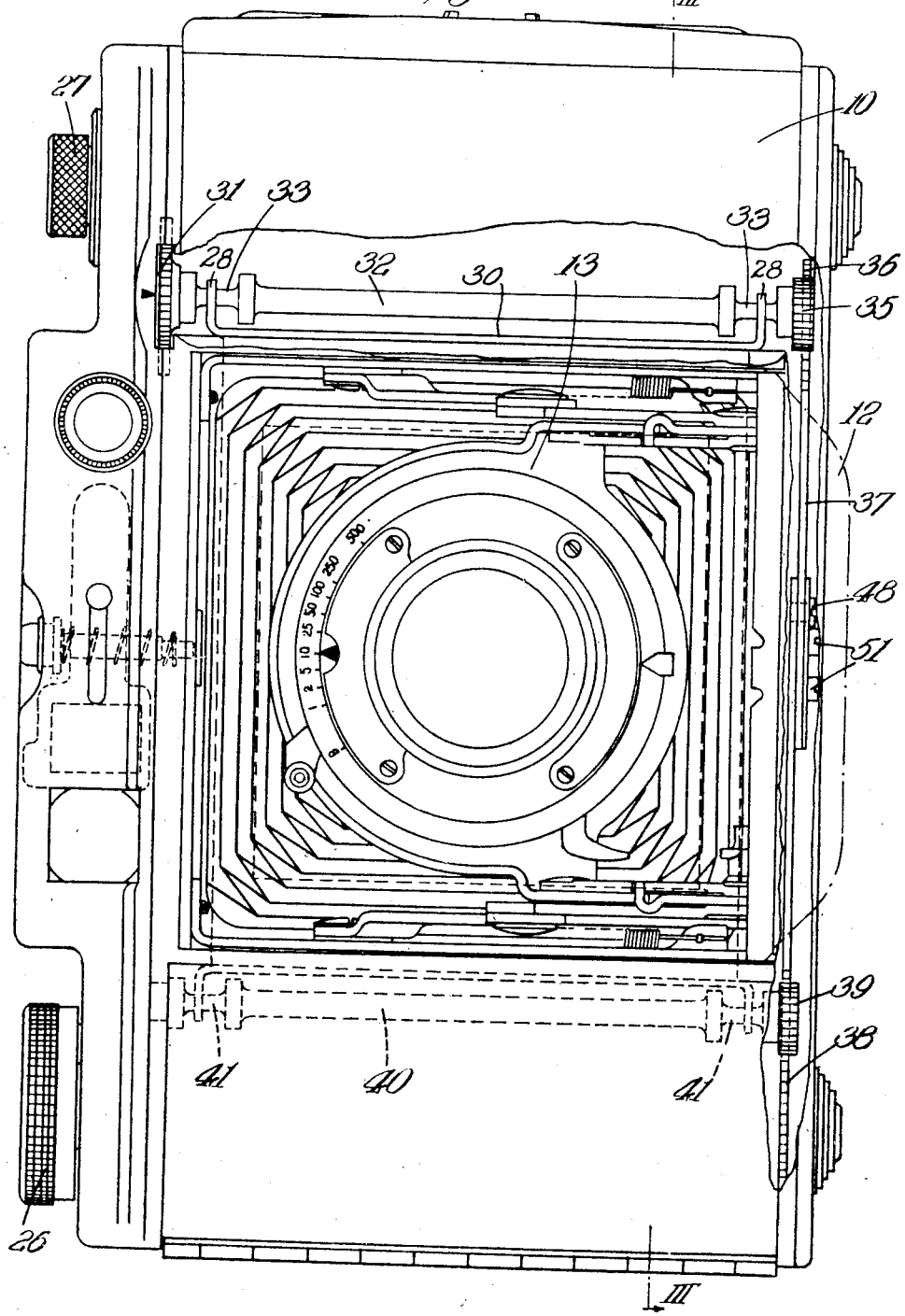
INVENTOR
BERNARD ARTHUR PARR
BY
Richards & Geier
ATTORNEYS Nov. 9, 1943. B. A. PARR 2,333,737
FOCUSSING DEVICES FOR ROLL-FILM CAMERAS
Filed Nov. 17, 1939 4 Sheets-Sheet 2
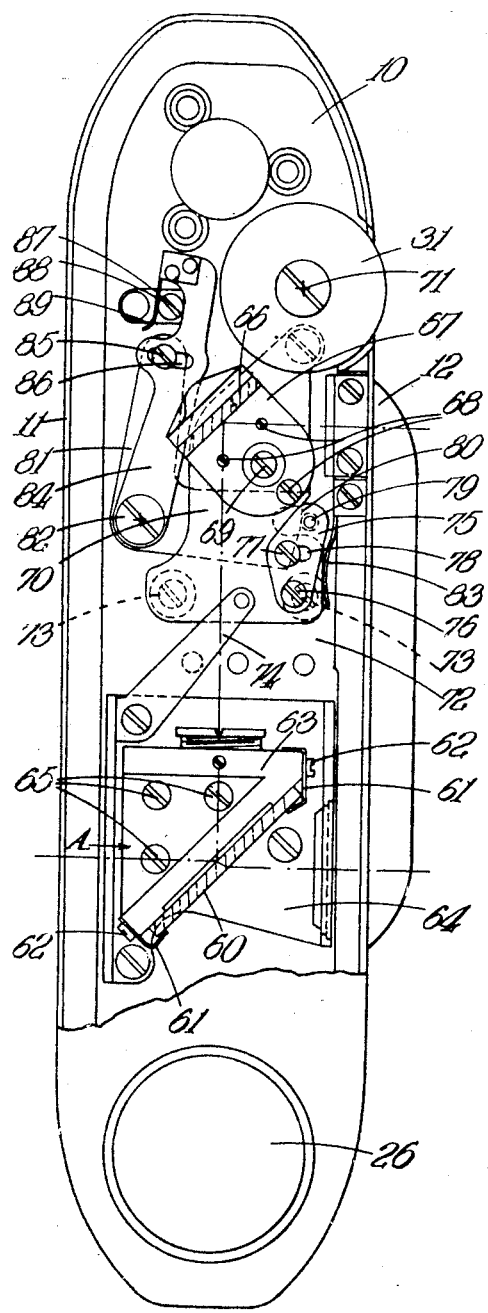
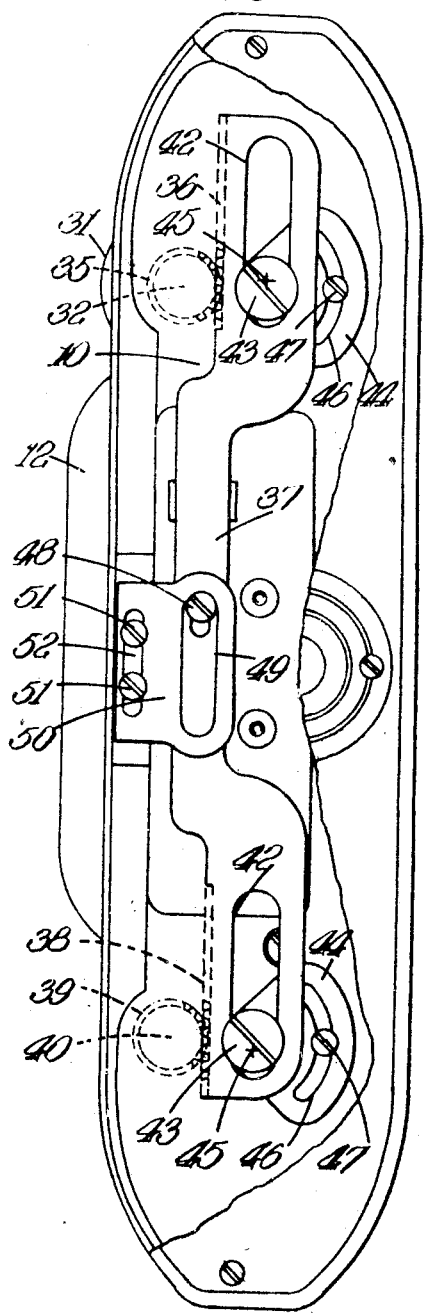
INVENTOR
BERNARD ARTHUR PARR
BY
Richards & Geier
ATTORNEYS

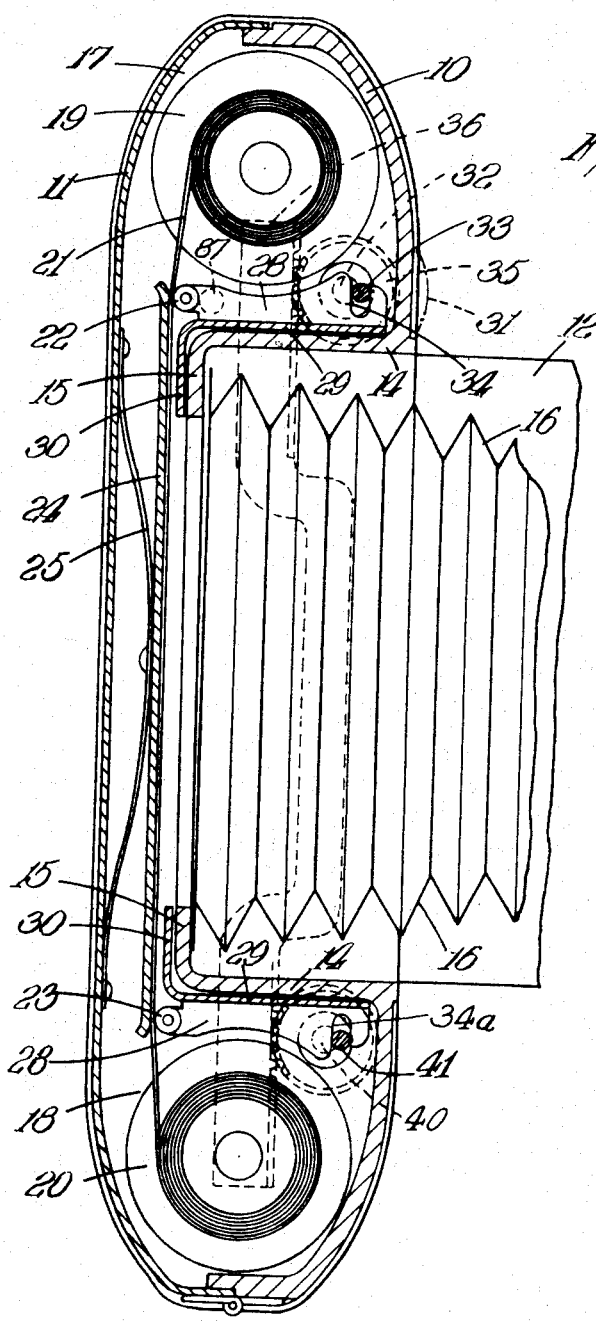

Nov. 9, 1943.  B. A. PARR  2,333,737
FOCUSSING DEVICES FOR ROLL-FILM CAMERAS
Filed Nov. 17, 1939  4 Sheets-Sheet 4
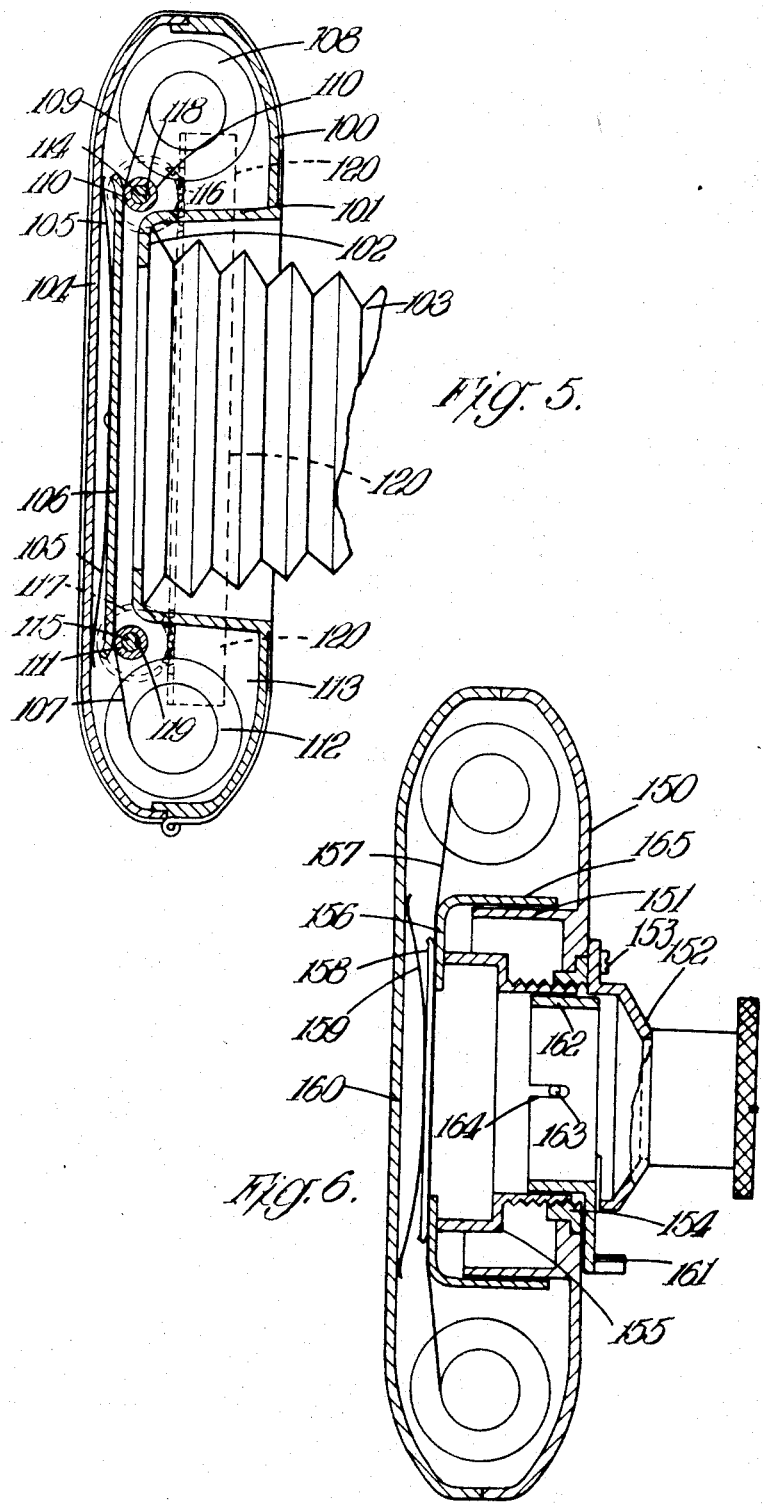
INVENTOR
BERNARD ARTHUR PARR
BY
Richards & Geier
ATTORNEYS Patented Nov. 9, 1943

2,333,737

UNITED STATES PATENT OFFICE 2,333,737

FOCUSING DEVICE FOR ROLL-FILM CAMERAS

Bernard Arthur Parr, East Sheen, London, England, assignor to The Houghton-Butcher Manufacturing Company Limited, London, England, a British company Application November 17, 1939, Serial No. 304,909
In Great Britain November 21, 1938

10 Claims. (Cl. 95—45)

The present invention relates to roll-film photographic cameras, and an object of this invention is to provide an improved focusing device which may if desired be combined with range finding means.

Broadly the invention involves the shifting of the focal plane of the camera, i. e., the plane of the film towards or away from the lens rather than shifting the lens relatively to the camera body.

According to the present invention focusing is effected in a roll-film camera by shifting the plane of the portion of the film to be exposed relatively to the camera body, the lens being, when in the position for use, immovably located with respect to the body, the said portion of the film being located by a member or members controllably movable in the direction of the optical axis.

Any suitable means may be used for controlling the film locating member, these means advantageously being mounted on the camera body. While the invention is not limited to cameras embodying a range finder it confers additional advantages when applied to such cameras since when the focusing control means are mounted wholly on or within the camera body they may readily be coupled to a range finder mounted thereon whereas in cameras in which the lens system is moved relatively to the camera body complicated linkage systems are required to couple the lens moving mechanism to a range finder mounted on the camera body.

Three constructional arrangements in accordance with this invention are illustrated by way of example only in the accompanying drawings.

In the drawings—

Fig. 1 is a front elevational view of a camera in accordance with the invention with parts cut away to show the focusing mechanism;

Fig. 2 is a side elevation showing the bottom of the camera of Fig. 1 with the cover removed to show the range finder;

Fig. 3 is a sectional view on the line III—III of Fig. 1;

Fig. 4 is a side elevation of the top of the camera of Fig. 1 with parts of the cover removed;

Figs. 5 and 6 are diagrammatic sectional views in side elevation of alternative arrangements of focusing mechanism in accordance with this invention.

Referring to Figs. 1 to 4: a camera comprises a body 10 provided with a back cover 11 and having in the front a hinged baseboard 12 which supports the lens panel, shutter, etc., 13. The lens panel is preferably of the self erecting type. When the lens panel is erected the lens is held immovably with respect to the camera body, no focusing movement of the lens being provided. Since this invention is not concerned with the erecting linkage or other means this will not be described, it being understood that any suitably rigid arrangement may be used.

The camera body 10 is provided in the front with a recess formed by inwardly directed flanges 14 with inturned edges 15 which lie parallel to and a short distance in front of the focal plane. A camera bellows 16 secured to the inturned edges 15 encloses the space between said edges and the lens panel. When the camera is closed the lens panel and bellows lie in the recess in the camera body and are covered by the hinged baseboard 12 which is slightly dished to give additional space. Optionally this may be arranged to accommodate filters or supplementary lenses in position in front of the lens of the camera.

At the ends of the camera are provided spool chambers 17 and 18 which contain the "unexposed" and "exposed" spools 19 and 20 respectively. The film 21 passes from the spool 19 to the spool 20 over rollers 22 and 23 at the ends of the focal plane, being maintained in contact with the rollers by a pressure plate 24. The pressure plate 24 is urged forwardly by long springs 25 arranged between it and the back of the camera 11. Means, not shown, are provided for locating the pressure plate in the camera to prevent its movement with the film 21 when it is wound on. The travel of the film is effected by a knob 26 which has a spindle engaging the spool 20. The spool 19 is held in position by a spring loaded spindle having a knob 27 at one end. In the arrangement shown the film has a backing strip and is wound from the "unexposed" to the "exposed" spool but it is obvious that the arrangement may be modified for use with cassette loading.

The rollers 22, 23 which engage the film at the ends of the focal plane are rotatably mounted on lugs 28 extending upwardly and downwardly from flanged parts 29 of an apertured plate 30. The edges of the aperture in the plate 30 form a mask for the picture space on the film.

When ready for exposure the film 21 is held between the rollers 22 and 23 and the pressure plate 24. Focusing adjustment is effected by moving these parts bodily in the direction of the optical axis, thus shifting the focal plane relatively to the camera body. In the arrangement shown in Figs. 1 to 4 the movement of the focal plane is effected by rotation of a focusing knob 31 mounted on a shaft 32 which extends across the camera from top to bottom. The shaft 32 has eccentrically arranged pins 33 a short distance from each end which engage slots 34 in the lugs 29 carried by the apertured plate 30. When the shaft 32 is rotated clockwise from the position shown (Fig. 3) the apertured plate 30 is moved rearwardly relatively to the camera body so that the distance between the lens and the film is increased.

The shaft 32 carries a pinion 35 which engages a rack 36 on a member 37 which extends within a cover along the bottom of the camera as seen in Fig. 1. A similar rack 38 at the other end of the member 37 engages a pinion 39 mounted on a shaft 40 similar to the shaft 32 and which is arranged at the opposite end of the focal plane. The shaft 40 carries eccentrically disposed pins 41, the eccentricity being the same as that of the pins 33 on the shaft 32. The pins 41 engage slots 34a in lugs 28 at the end of the apertured plate 30.

It will be seen that the apertured plate 30 is located adjacent each of its corners, the positions of which are controlled by the pins 33 and 41 carried on the shafts 32 and 40 respectively. The shafts 32 and 40 are moreover coupled together by the rack member 37 so that they must move simultaneously thus preventing any displacement of the apertured plate 30 from a plane perpendicular to the optical axis of the lens. To ensure that this condition is maintained great accuracy in manufacture and adjustment is essential and backlash in the mechanism must be eliminated.

To ensure that the racks 36 and 38 on the member 37 closely engage their respective pinions 35 and 39, means are provided for adjusting the position of the member 37 relatively to the shafts 32 and 40. At each of its ends the member 37 has a slot 42 which is engaged by a headed bolt 43 the shank of which is a close fit in the slot 42. The bolts 43 are secured to sector plates 44 which are pivotally connected to the camera body 10 at points 45 which in the mid position of adjustment as shown lie outside the axes of the bolts 43. Each sector plate 44 has an arcuate slot 46 which is engaged by a bolt 47 for locking the plate to the camera body. By moving the sector plates 44 relatively to the camera body the racks 36 and 38 can be moved towards the pinions 35 and 39 to compensate for any wear which may occur.

The limits of longitudinal travel of the rack member 37 are controlled by engagement of the head of a bolt 48 mounted thereon with the ends of a slot 49 in a plate 50 adjustably secured to the camera body by two bolts 51 which pass through an elongated slot 52 in the plate 50. The plate 50 is secured in the position in which the camera is focused at infinity when the bolt 48 is at the upper end of the slot 49.

A great advantage of having the parts which are required to move for focusing adjustment housed within the camera body is that the focusing control can readily be coupled to these parts whereas when the focusing adjustment is by relative movement between the lens panel and the camera body a complicated linkage which also has to allow of folding of the camera is necessary.

In the camera illustrated in Figs. 1 to 4 a short-base range-finder of the split image type is coupled to the focusing knob 31. The arrangement is shown in Fig. 2. The observer looks in the direction of the arrow A along the dotted line. One part of the field is seen through the upper (unsilvered) part of the mirror 60, which is secured by springs 61 bolted at 62 to a block 63, the position of which is adjustable relatively to a plate 64 mounted on the camera body. The correct levelling of the mirror 60 is effected by adjustment of three screws 65.

The other half of the field is seen in the lower silvered part of the mirror 60 being reflected from a movable mirror 66 coupled to the focusing knob 31. The mirror 66 is carried on a bracket 67 which is adjustably mounted on an arm 70 pivoted at 71 to the camera body, levelling adjustment of the bracket 67 being effected by three screws 68 and a locking screw 69. The end of the arm 70 remote from the pivot 71 has, on its under surface, two bushes 73 which slide over the base plate 72 as the range-finder is adjusted. A leaf spring 74 is arranged to press the bushes 73 against the base plate. The arm 70 also has a plate 75 bolted to its upper surface at its free end by two bolts 76, 77, the latter being adjustable along a slot 78 in the plate 75. The plate 75 carries a pin 79 which is pressed by a spring 83 into contact with cam surface 80 of a crank arm 81 pivoted at 82 to the camera body. Adjustably secured to the other arm of the crank arm 81 is a lever 84 having a slot 86 engaged by a screw 85 for clamping the lever 84 and crank arm 81 together. The end of the lever 84 remote from the pivot 82 is maintained in contact with a range-finder coupling 87 by a spring 88. The coupling pin 87 is mounted on one of the lugs 28 on the apertured plate 30, as shown in Fig. 3.

As the apertured plate 30 is moved in the direction of the optical axis for focusing, the coupling pin 87 moves in a slot 89 in the camera body 10. This causes pivotal movement of the lever 84 and crank arm 81 about the pivot 82 and hence relative movement between the cam surface 80 and the pin 79. The pin 79, being urged by the spring 83 against the cam surface 80, causes movement of the arm 70 carrying the mirror 66 about the pivot 71. The cam surface 80 is so designed as to provide the correct relation between the movement of the focusing knob 31 and the angular movement of the range-finder mirror 66.

Fig. 5 shows an alternative construction in which the camera body 100 has an inturned flange 101 with edges 102 to form a recess in the front of the camera body in which recess the camera bellows 103, lens panel and associated parts (not shown) are housed when the camera is closed. The back of the camera is closed by a back plate 104 which forms the reaction surface for the springs 105 of a pressure plate 106. The film 107 passes from an upper spool 108 in the upper spool chamber 109 over rollers 110, 111 against which it is pressed by the pressure plate 106 to the lower spool 112 in the lower spool chamber 113. The rollers 110, 111 are in the form of sleeves which are freely rotatable on spindles 114, 115 secured at one end in an eccentric position to pinions 116, 117 which are mounted for rotation about axes 118, 119 respectively. The pinions 116 and 117 are coupled together to move simultaneously and by equal amounts by a rack member 120 which is moved lengthwise relatively to the camera body to cause rotation of the pinions and hence movement of the axes of the film rollers 110, 111 having a component in the direction of the optical axis thus moving the focal plane relatively to the camera body and lens panel which latter is, when erected, located immovably with respect to the camera body.

Fig. 6 shows a second alternative construction in which the camera body 150 has an inturned flange 151 and has secured to its front part the rigid lens mounting 152, which may be detached by unscrewing a bolt 153. Clamped between the lens mounting 152 and the body of the camera is a ring 154 which is internally screw threaded for engagement with an external screw thread on an annular member 155. The member 155 engages at its inner end an apertured plate 156 against which the film 157 is pressed by a pressure plate 158 having springs 159 between it and the back of the camera 160. The focusing control arm 161 is joined to a ring 162 and is rotatable relatively to the camera body 150. The ring 162 is coupled to the annular member 155 by a pin 163 on the latter which engages a slot 164 in the ring 162 so that rotational movement can be transmitted from the ring 162 to the member 155 while allowing the latter to move in the direction of the optical axis under the action of the screw thread.

When the focusing control arm 161 is moved, rotation of the ring 162 causes rotation of the annular member 155 which moves in the direction of the optical axis, moving with it the apertured plate 156, film 157 and pressure plate 158. The apertured plate is restrained against rotation by flanges 165 which engage noncircular parts of the flange 151 on the camera body. By this means the focal plane is moved relatively to the camera body.

What I claim is:

1. A roll-film camera comprising in combination a lens immovably located with respect to the camera body when in a position for use, a spring loaded pressure plate, an apertured plate disposed between the pressure plate and the lens, and means on said said apertured plate adapted to engage only that portion of the film extending between the film rolls, the film when in position being held between the pressure plate and said means and means for controllably moving the apertured plate relatively to the camera body for focusing adjustment.

2. A roll-film camera comprising in combination a lens immovably located with respect to the camera body when in a position for use, a spring loaded pressure plate, an apertured plate disposed between the pressure plate and the lens, and carrying rollers on said apertured plate adapted to engage only that portion of the film extending between the film rolls, the film when in position, being clamped between the pressure plate and said rollers and means for controllably moving the apertured plate relatively to the camera body for focusing adjustment.

3. A roll-film camera comprising in combination a lens immovably located with respect to the camera body when in a position for use, a spring loaded pressure plate, an apertured plate disposed between the pressure plate and the lens and means on said apertured plate adapted to engage only that portion of the film extending between the film rools, the film when in position being held between the pressure plate and said means and means for controllably moving the apertured plate relatively to the camera body for focusing adjustment comprising a slotted lug on the apertured plate, an external focusing control and a pin eccentrically mounted on the shaft of said control and engaging said slotted lug.

4. A roll-film camera comprising in combination a lens immovably located with respect to the camera body when in a position for use, a spring-loaded pressure plate, an apertured plate disposed between the pressure plate and the lens, and carrying rollers on said apertured plate adapted to engage only that portion of the film extending between the film rolls, the film which in position for exposure is clamped between the pressure plate and the rollers and means for controllably moving the apertured plate relatively to the camera body for focusing adjustment comprising a plurality of slotted lugs disposed at opposite ends of the apertured plate engaged by pins eccentrically mounted on shafts coupled together to move simultaneously.

5. A roll-film camera comprising in combination a lens immovably located with respect to the camera body when in a position for use, a spring loaded pressure plate, a roller adjacent each end of the portion of film to be exposed and against which the film is pressed by the pressure plate and means for moving said rollers in the direction of the optical axis and relatively to the camera body for focusing adjustment.

6. A roll-film camera comprising in combination a lens immovably located with respect to the camera body when in a position for use, a spring-loaded pressure plate, a roller adjacent each end of the portion of film to be exposed and against which the film is pressed by the pressure plate, each of said rollers consisting of a sleeve rotatably carried on a spindle mounted on eccentrics which are rotated relatively to the camera body for focusing adjustment.

7. In a roll film camera, a lens, a mounting for said lens whereby it is positioned immovably for use, parallel spaced holders for film spools, movable film guide means located between said holders for guiding only a portion of film which extends between spools in said holders, said film bearing upon said film guide means at that side of the latter remote from the lens whereby such portion of the film is positioned for exposure, a mounting for said film guide means whereby perpendicularity thereof to the axis of the lens is maintained, and focusing control means operable at will to impart to said film guide means bodily movement in relation to said spool holders away from and towards the lens.

8. In a roll film camera, a lens, a mounting for said lens whereby it is positioned immovably for use, parallel spaced holders for film spools, movable film guide means located between said holders for guiding only a portion of film which extends between spools in said holders, said film bearing upon said film guide means at that side of the latter remote from the lens whereby such portion of the film is positioned for exposure, a mounting for said film guide means whereby perpendicularity thereof to the axis of the lens is maintained, range finding means, and focusing control means coupled operatively with said range finding means and operable at will to impart to said film guide means bodily movement in relation to said spool holders away from and towards the lens.

9. In a roll film camera, a lens, a mounting for said lens whereby it is positioned immovably for use, parallel spaced holders for film spools, movable film guide means located between said holders for guiding only a portion of the film which extends between said film spools, a spring-loaded pressure plate pressing said portion against said film guide means at that side of the latter remote from the lens whereby such portion of the film is positioned for exposure, a mounting for said film guide means whereby perpendicularity thereof to the axis of the lens is maintained, and focusing control means whereby bodily movement in relation to the spool holders away from and towards the lens may be imparted at will to the film guide means.

10. A camera comprising in combination, a camera body having a screw thread, film rolls within said body for supporting a film, a lens immovably located with respect to the camera body when in position for use, an apertured plate disposed on the lens side of the film so as to bear only on that portion of the film extending between the film rolls in position for exposure, a spring-loaded pressure plate disposed to hold the film against said apertured plate, an annular member in engagement with said apertured plate to retain the latter in contact with the film and having a screw-thread engaging said screw-thread on the camera body, and means for rotating said annular member relatively to the camera body to thereby move said apertured plate for focusing adjustment.

BERNARD ARTHUR PARR.